Oct. 3, 1933. F. W. COREY Re. 18,963

METHOD OF MAKING KNITTING MACHINE LATCH NEEDLES

Original Filed Feb. 1, 1930 2 Sheets-Sheet 1

Inventor:
Fred W. Corey
By Macleod, Calver, Copeland & Dike.
Attorneys.

METHOD OF MAKING KNITTING MACHINE LATCH NEEDLES

Original Filed Feb. 1, 1930 2 Sheets-Sheet 2

Inventor:
Fred W. Corey
By Macleod, Calver, Copeland & Dike
Attorneys.

Reissued Oct. 3, 1933

Re. 18,963

UNITED STATES PATENT OFFICE 18,963

METHOD OF MAKING KNITTING MACHINE LATCH NEEDLES

Fred W. Corey, Tilton, N. H., assignor to The Torrington Company, Torrington, Conn., a corporation of Connecticut Original No. 1,874,457, dated August 30, 1932, Serial No. 425,163, February 1, 1930. Application for reissue June 28, 1933. Serial No. 678,099

9 Claims. (Cl. 163—3)

This invention relates to a new and useful improvement in knitting machine latch needles and the method of making the same.

The invention relates to the pivot connection between the latch and the needle, especially where the pivot is integral with the needle. According to some methods heretofore employed such pivot connection has been formed by use of a punch of the same diameter as the hole in the latch whereby a portion of the metal which forms the wall of the needle slot is punched into the hole in the latch.

According to the present invention as distinguished from the old method the metal which forms the pivot is forced in by a tool of larger diameter than the hole in the latch, the latch being of tempered metal and the needle untempered, that is, at the time of forming the pivot the metal which forms the wall of the needle slot is softer than that of the latch.

According to the present invention the pivot is preferably formed by use of a tool of larger diameter than the pivot hole in the latch operated to form a depression in the outer face of the needle of greater diameter than the pivot hole in the latch and force the displaced metal of the needle into the said pivot hole. Preferably this is done by two oppositely disposed dies which are simultaneously actuated to engage the outer faces of the opposite walls of the needle slot and press portions of them toward each other to form two oppositely disposed pivot members which are forced into the pivot hole in axial alinement with each other.

The invention will be more fully understood from the following description when taken in connection with the accompanying drawings and the novel features thereof will be pointed out and clearly described in the claims at the close of this specification.

Figure 1:
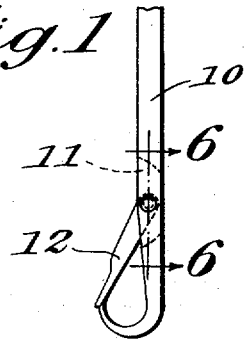
Fig. 1 is a side view on an enlarged scale and partly broken away of a knitting machine latch needle embodying the invention.
Figure 6:
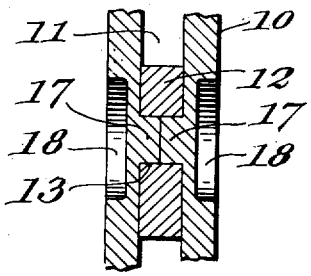
Fig. 6 is a sectional view on line 6—6 of Fig. 1 on an enlarged scale showing the united needle and latch after the presser members have been retracted.
Figure 2:
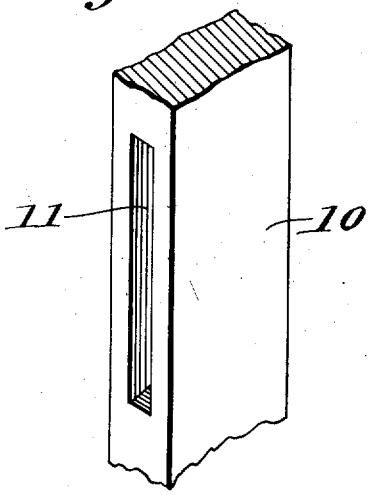
Fig. 2 is a perspective view on an enlarged scale and partly broken away of the shank of the needle before the needle and latch are assembled.
Figure 3:
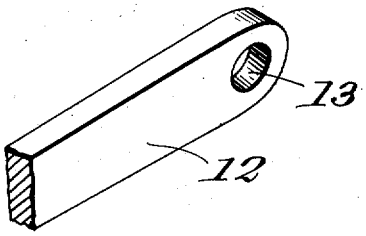
Fig. 3 is a perspective view on an enlarged scale of the latch partly broken away and before assembling with the needle.

Referring to the drawings there is shown in Fig. 2 at 10 a portion of a slotted needle before the latch 12 is attached, the needle being formed as usual with a slot 11 for the latch. Fig. 3 shows the latch before being attached to the needle and having the pivot hole 13. The latch is tempered and the needle as yet is untempered.

Figure 4:
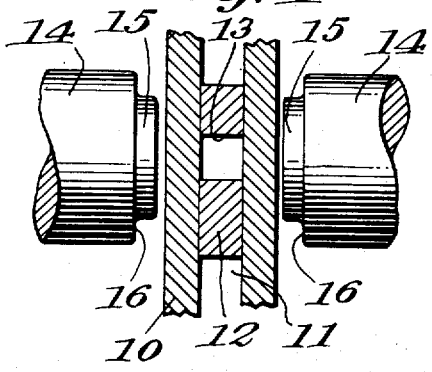
Fig. 4 is a view partly in section of the needle and latch and of the presser members, partly broken away, in assembled position preparatory to forming the pivot connection.
Figure 5:
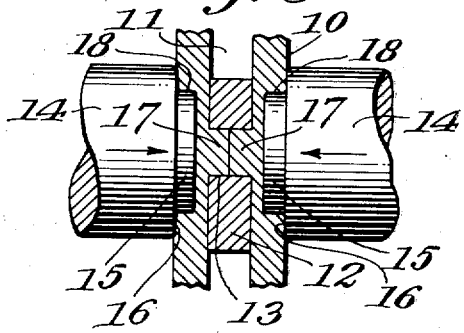
Fig. 5 is a view, partly in section, showing the element of Fig. 4 after the presser members have been moved toward each other and formed the pivot connection between the needle and latch.
Figure 7:
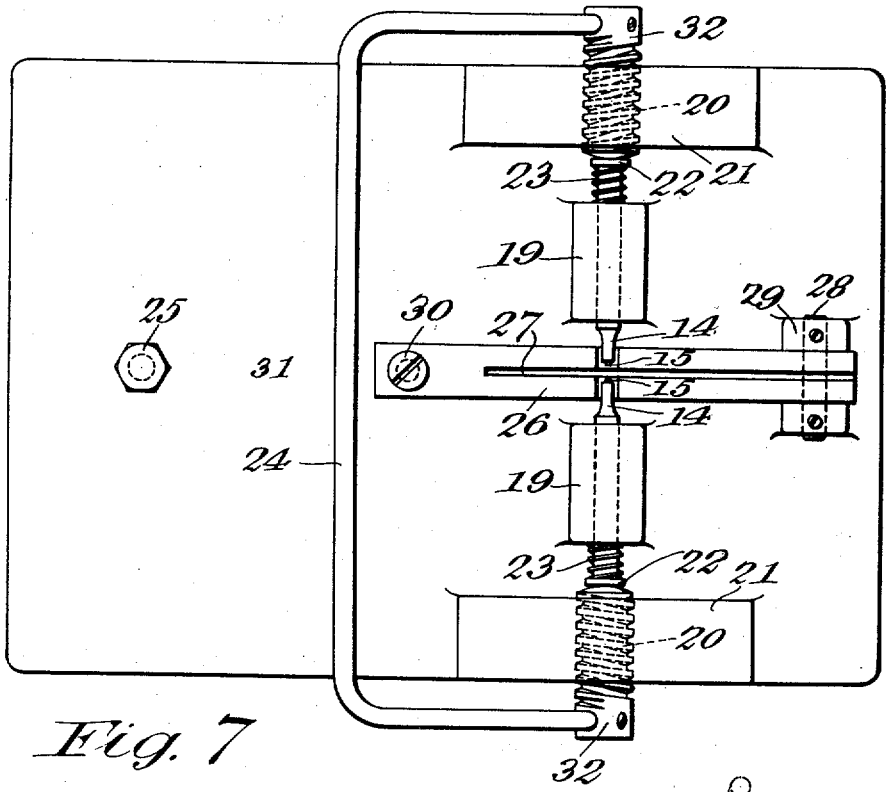
Fig. 7 is a plan view showing one form of presser actuating mechanism, the operating lever being turned part way down as shown in Fig. 8.
Figure 8:
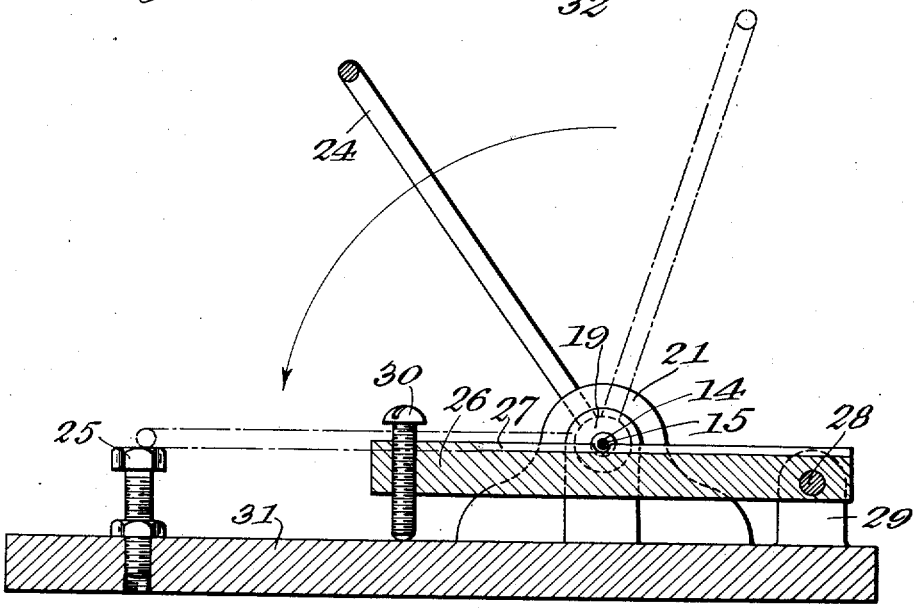
Fig. 8 is a vertical section on line 8—8 of Fig. 7.

In Fig. 4 the latch and needle are shown in assembled preparatory position, the pivot hole of the latch being between the cheeks of the needle and the two axially movable presser members 14, 14 in alinement with each other on opposite sides of the needle and in alinement with the hole in the latch.

Two axially movable die or presser members to form the pivot are preferably employed. Each presser member has a shank portion 14 terminating in a short cylindrical die portion 15 of somewhat larger diameter than the pivot hole 13 in the latch. The shank 14 is of larger diameter than the die portion 15 whereby there is formed a shoulder 16 between the shank 14 and the die 15.

Mechanism should be provided in which the assembled latch and needle are mounted, also mechanism in which the die members are mounted in axial alinement with each other and with the hole in the latch, also mechanism for reciprocating the two die members toward and away from each other while the needle and latch are in the assembled position preparatory to making the pivot connection. The presser members will then be actuated to move toward each other and cause the die portions 15, 15 to engage the outer walls of the needle slot with sufficient pressure to form a cylindrical depression 18 in the outer face of the wall of the needle and thereby cause a portion of the inner face of the wall to project inwardly. By reason of the fact that the hole 13 in the latch is the only outlet for the displaced metal of the needle, and the metal of the latch is harder than that of the wall of the needle slot, the latch slot will serve as a die and a portion of the wall of the needle slot will be forced to flow, so to speak, into the smaller hole in the latch. Thus there will be formed two axial pivot portions 17, 17 integral with the respective side walls of the needle slot which will fill the pivot hole in the latch.

The shoulders 16, 16 of the two presser members will engage the outer faces of the walls of the needle slot at the close of the initial squeezing operation which forms the trunnions 17 and prevent the said walls from bulging outward during the process.

Preferably the die 15 of each presser member extends forward from the shoulder 16 of a length equal to one-half the diameter of the thickness of the latch so that the two pivot portions 17, 17 will meet half way through the hole. Any suitable mechanism may be employed for holding and clamping the needle and latch in their assembled position during the operation, also any suitable mechanism may be employed for holding the presser members and to force them toward each other to push inwardly a portion of the walls of the needle slot and thereby form the pivot and then to withdraw the presser members. In the presser actuating mechanism shown in the drawings the shank 14 of each presser member is slidably mounted in a bearing 19 in which it is axially movable. Oppositely disposed worm screws 20, one of which is a right-hand and the other a left-hand screw, have threaded engagement respectively with tapped out bearing members 21. The shank 14 of each presser member has a head 22 which is normally held in engagement with the forward end of one of the screws 20 by a spring 23 one end of which engages with said head, the other end of said spring engaging with the end of the bearing 19 of the presser member.

A forked operating lever 24 has two arms which are respectively connected with the heads 32 of the worm screws 20 whereby the said screws may be rotated in either direction on their axes to cause linear movement of the screws forward or back according to the direction of rotation. The forward movement forces forward the shank 14 together with its presser portion 15 to press upon the needle and form the pivots 17 as previously described. When the lever 24 is turned back the screws 20 will be moved backward and the expansion of the springs 23 will cause the presser members to follow the screws in their retreating movement. At 25 is shown a stop to limit the downward swing of the lever 24.

At 26 is shown an adjustable member having a groove 27 to form a bed for the needle during the operation. One end of the said member 26 is pivoted at 28 to a member 29 rising from the base 31 and the other end of said member 26 is supported by an adjusting screw 30 whose lower end rests upon said base 31.

While I have described the latch as being tempered and the needle as being untempered, that being the preferred state of said two members, the invention is not limited in application to precisely those conditions of the latch and needle. The essential condition is that the metal of the latch shall be harder than that of the needle, that is, the walls of the needle slot shall be sufficiently less hard or more moldable than the latch so as to permit a portion of the wall of the needle slot under pressure to be forced into the hole in the latch.

By making a bearing for the latch as above described that is, by pressing, a portion of the untempered walls of the needle slot into the pivot hole in the tempered latch, each of the two opposite walls surrounding the pivot hole of the tempered latch acts as one member of a die and each of its two presser members of larger diameter than the hole in the latch acts as the cooperating member of the die for pressing in a portion of the two walls of the needle slot to form a depression 18 of larger diameter than the hole 13 in the latch. As the metal of the needle is softer than that of the latch it will yield under the pressure after the manner of plastic substance forced into a mould. The pressure being equal upon the two opposite sides of the needle, an equal amount from each wall of the needle will be forced into the pivot hole in the latch and completely fill the hole.

The fact that the latch is tempered and that the needle is untempered until after the pivot connection is made will prevent any distortion or breaking out of the weaker part of the latch. After the pivot connection is made the needle should be tempered.

The fact that the hole in the latch is filled its full diameter with stock from the walls of the needle is important. In the process of tempering the needle the steel is expanded by heat and contracted by cooling and also a thin scale is formed by oxidization, this wall being removed as soon as the latch is put in motion, thus leaving a so-called running fit.

I wish to emphasize the fact that the metal forming the pivot is not punched in, but in distinction therefrom it is pressed in.

By my method, the bearing for the latch is of uniform diameter throughout its length and by reason of being integral with the wall of the needle slot it cannot become loosened through use.

If the bearing should be formed by a tapered punch, even though the bearing is integral with the wall, it will be conical and will become distorted by use. If a straight or cylindrical punch of uniform diameter is used and the bearing is punched out, it either will not fill the hole in the latch or it will upset and break open the wall of the latch at its weakest point.

By the use of a die or presser member of larger diameter than the hole in the latch and by pressing the metal from the wall into the hole as I have previously described, it has a tendency to stiffen the walls and prevent spreading.

I claim:

1. The method of forming a knitting machine latch needle comprising making a needle blank with a slot to receive a latch, forming a latch with a pivot hole, inserting said latch into said slot, exerting pressure on the walls of the needle slot over the pivot hole, thereby squeezing a portion of said walls into the pivot hole in the latch sufficient to form oppositely disposed members in face contact, and at the end of the squeezing action pressing the outer faces of the walls of the needle slot adjacent the pivots to prevent outward bulging of the needle walls, and then tempering the needle.

2. The method of forming a knitting machine latch needle comprising making a needle blank with a slot to receive a latch, forming a latch with a pivot hole, inserting said latch into said needle slot, exerting pressure upon the walls of the needle slot over the pivot hole and over a larger surface area than the cross section of the pivot hole in the latch, and thereby squeezing portions of said walls into the pivot hole in the latch sufficient to form a solid pivot, and then tempering the needle.

3. The method of forming a knitting machine latch needle comprising making a needle blank with a slot to receive a latch, forming a latch with a pivot hole, inserting said latch in said needle slot, exerting pressure upon the walls of the needle slot to cause a flow of metal from each wall into the pivot hole to fill the same by solid trunnions facing each other, the pressure being exerted on a greater area than the cross sectional area of the pivot hole whereby the flow of metal outwardly is prevented and the walls of the needle blank adjacent the trunnions are kept from bulging.

4. The method of forming a knitting machine latch needle comprising making a needle blank with a slot to receive a latch, forming a latch with a pivot hole, inserting the said latch into said needle slot, exerting pressure upon the walls of the needle slot over the pivot hole and over a larger surface area than the cross sectional area of the pivot hole thereby compressing a sufficient portion out of the cheeks of the slot to completely fill said pivot hole, thereby forming a solid cylindrical pivot, clamping the outer faces of the cheeks of the slot at the end of the pressing operation, then tempering the needle.

5. The method of forming a knitting machine latch needle comprising making an untempered needle blank with a slot to receive a latch, forming a tempered latch with a pivot hole, inserting said latch into the said needle slot, exerting pressure upon the walls of the needle slot over the pivot hole and over a larger surface area than the cross section of the pivot hole in the latch and thereby squeezing portions of said walls into the pivot hole in the latch sufficient to fill said hole and form a solid pivot and then tempering the needle.

6. The method of forming a knitting machine latch needle comprising making an untempered needle blank with a slot to receive a latch, forming a tempered latch with a pivot hole, inserting the said latch into said needle slot while the needle is still untempered, exerting pressure upon the walls of the needle slot over the pivot hole and over a larger surface area than the cross sectional area of the pivot hole, thereby compressing a sufficient portion out of the cheeks of the slot to completely fill said pivot hole thereby forming a solid cylindrical pivot, clamping the outer faces of the cheeks of the slot at the end of the pressing operation, then tempering the needle.

7. The method of forming a knitting machine latch needle comprising making an untempered needle blank with a slot to receive a latch, forming a pivot hole in a latch, tempering the latch, inserting the tempered latch in said needle slot, exerting pressure upon both cheeks of the needle slot over the pivot hole and over a larger surface area than the cross sectional area of the pivot hole while the needle is still in untempered state, thereby forming a depression in each cheek of the needle slot of greater diameter than the pivot hole and compressing a sufficient portion of the needle wall into said pivot hole to completely fill the same and form a solid pivot, then tempering the needle.

8. The method of forming a knitting machine latch needle comprising making an untempered needle blank with a slot to receive a latch, forming a tempered latch having a pivot hole therein, inserting said latch into the said needle slot, exerting pressure upon a portion of the outer surface of at least one of the walls of the needle slot, said pressure being over a greater surface area of said wall than the cross sectional area of said pivot hole in the latch and thereby squeezing a portion of said wall into the pivot hole sufficient to fill the hole.

9. The method of forming a knitting machine latch needle comprising making an untempered needle blank with a slot to receive a latch, forming a tempered latch having a pivot hole therein, inserting said latch into the said needle slot, exerting pressure upon a portion of the outer surface of at least one of the walls of the needle slot, said pressure being over a greater surface area of said wall than the cross sectional area of said pivot hole in the latch and thereby squeezing a portion of said wall into the pivot hole sufficient to fill the hole, and then tempering the needle.

FRED W. COREY.